United States Patent [19]
Li

[11] Patent Number: 5,945,749
[45] Date of Patent: Aug. 31, 1999

[54] ON-BOARD ELECTRICAL POWER GENERATOR OPERATED BY VIBRATION OR COMPRESSED AIR

[75] Inventor: Wei Li, Pittsburgh, Pa.

[73] Assignee: Westinghouse Air Brake Company, Wilmerding, Pa.

[21] Appl. No.: 09/095,082

[22] Filed: Jun. 10, 1998

[51] Int. Cl.$^6$ .......................... H02K 33/00; H02K 35/00; F03B 13/12
[52] U.S. Cl. ................................ 310/15; 310/81; 310/36; 290/42; 290/53
[58] Field of Search ................................ 310/12, 13, 15, 310/17, 20, 21, 27, 28, 30, 34, 35, 36, 81; 290/53, 42

[56] References Cited

U.S. PATENT DOCUMENTS

| | | | |
|---|---|---|---|
| 3,555,314 | 1/1971 | Vilaroel | 310/15 |
| 3,766,399 | 10/1973 | Demetrescu | 290/42 |
| 5,084,630 | 1/1992 | Azimi | 290/53 |
| 5,696,413 | 12/1997 | Woodbridge et al. | 310/15 |

FOREIGN PATENT DOCUMENTS 07145776  6/1995  Japan .
10066323  3/1998  Japan .

*Primary Examiner*—Nestor Ramirez
*Assistant Examiner*—Tran Nguyen
*Attorney, Agent, or Firm*—James Ray & Associates

[57] ABSTRACT

The invention provides an on-board electrical power generator for application on railway cars as a power supply for Electronically Controlled Pneumatic (ECP) brake equipment and other on-board electronic devices, such as an end of train unit. The generator unit can by operated by vehicle vibration when the train is moving, or by fluid pressure from the brake line when the train is stopped. The generator unit has a magnetic piston surrounded by a coil and is engaged on either end by diaphragm-spring combinations. This arrangement creates a mass-spring system in which the magnetic piston vibrates under external excitation. The oscillation of the magnetic piston as a result of vehicle movement allows interaction between the magnetic piston and a coil and thus generates electrical voltage across the coil as a result of vibration. The diaphragms of the diaphragm-spring combinations create two sealed chambers on the first and second ends of the generator which allows the piston to be actuated by fluid pressure. Fluid pressure from a control valve alternately flows between the first chamber and the second chamber causing the piston to oscillate and thus create an electrical voltage across such coil and thereby generating electrical power.

28 Claims, 3 Drawing Sheets

ON-BOARD ELECTRICAL POWER GENERATOR OPERATED BY VIBRATION OR COMPRESSED AIR

FIELD OF THE INVENTION

This invention relates, in general, to pneumatically powered generators and to vibration powered generators and, more particularly, this invention relates to an on-board electrical power generator operated by vibration or compressed air for use on railway vehicles.

BACKGROUND OF THE INVENTION

Pneumatic air brakes have been in use for more than 100 years and have been an extremely reliable system. In recent years electronic controls have been incorporated in the air brake system. The introduction of electronic controls increases the precision of the braking system while maintaining the strength, reliability and efficiency of pneumatic power.

These electrical or electronic control systems generally require batteries in the individual railway freight car and it is desirable to provide a generator on each car to maintain the batteries in a charged condition. For most of the Electronically Controlled Pneumatic (ECP) braking systems a small power level may be sufficient to keep the batteries charged.

One of the challenges in the development of (ECP) brake equipment for railway freight cars is to have a way to supply electrical power required by the electronics. This power supply must be reliable in typical railroad environments, easy to operate and maintain, and not interfere with the operations of the train.

Some current designs of ECP systems call for a battery system trickle charged by a power source from a front end locomotive. This method requires installation and maintenance of a cable line on each car. In addition to the connection of the brake hoses, the cables must be connected when cars are linked to form a train. In a typical railroad environment, the connectors used must be protected from damage and corrosion.

Another design that has been tested on trains is a vibration operated generator. This system eliminates the cable, but it operates only when the train is moving because it relies on vibration. When cars need to be charged before they move, a separate charging system must be used.

There is a need for an on-board electrical generator that does not require a cable link on each car and yet can keep the batteries in a charged condition even when the train is standing still.

SUMMARY OF THE INVENTION

In a first aspect, this invention provides an electric power generator for use on a railway vehicle. The generator comprises a housing member with a magnetic piston that is axially disposed within the housing. Such magnetic piston has a first end and a second end each having a rodlike member extending outwardly substantially from a midpoint of a longitudinal axis extending through the magnetic piston. Such first and second rod like members on such first end and such second end of such magnetic piston have a first predetermined diameter and a second predetermined diameter, respectively. The generator further includes a first diaphragm disposed in the housing member. The first diaphragm, having a first central opening with a third predetermined diameter, engages the first end of the magnetic piston with the first rodlike member of the magnetic piston extending through the first central opening. There is a first cover for the housing member, such first cover has a cylindrically shaped and generally hollow projection to accommodate longitudinal movement of the first rodlike member of the magnetic piston and further has a first chamber connected for fluid communication with a first source of fluid pressure. Such first chamber is sealed by the first diaphragm. There is further a second diaphragm disposed in the housing. Such second diaphragm, having a second central opening with a fourth predetermined diameter, engages the second end of the magnetic piston with the second rodlike member of the piston extending through the second central opening. The housing member has a second cover. Such second cover has a cylindrically shaped and generally hollow projection to accommodate longitudinal movement of the second rodlike member of the magnetic piston and further has a second chamber connected for fluid communication with a second source of fluid pressure. Such second chamber is sealed by the second diaphragm, wherein fluid pressure in the second chamber is being exhausted when said the first chamber is being pressurized and fluid pressure in the first chamber is being exhausted when the second chamber is being pressurized. The generator further includes a first biasing means that is axially disposed within the first chamber. Such first biasing means is caged between the magnetic piston and an inner surface of the first cover. The first biasing means provides a first bias for such magnetic piston. A second biasing means is axially disposed within the second chamber, such second biasing means is caged between the magnetic piston and an inner surface of the second cover. Such second biasing means provides a second bias for the magnetic piston. The generator further has an electric coil disposed within the housing member. Such electric coil is positioned so as to encircle at least a predetermined portion of the magnetic piston whereby movement of the magnetic piston creates a voltage across the coil and thereby generating electric power.

In a second aspect the present invention provides an on-board electrical power generation system for generating electrical power on a railway freight vehicle, such electrical power generation system comprises a generator unit, a control valve, and a switching mechanism. The generator unit is described supra. A piston type control valve is connected to a source of fluid pressure and is further in fluid communication with such first chamber in the first end and such second chamber in the second end of the generator unit. The piston type control valve communicates fluid pressure alternately to such first chamber and such second chamber of the generator unit causing such magnetic piston to oscillate by fluid pressure between such first diaphragm and first biasing means and such second diaphragm and second biasing means thereby generating an electrical voltage across the coil. A switching means controls such fluid pressure supply to the control valve, such switching means opens to communicate fluid pressure to such control valve when such railway car is not moving thereby causing the magnetic piston to oscillate by fluid pressure and closes to restrict the flow of fluid pressure to such control valve when such railway car is moving thereby permitting the magnetic piston to oscillate between such first diaphragm and biasing means and such second diaphragm and biasing means by means of vehicle vibration.

OBJECTS OF THE INVENTION

It is, therefore, one of the primary objectives of the present invention to provide a simple and inexpensive on-board electrical power generator for supplying electrical power to electronic units on a railway freight car.

It is also an object of the present invention to provide an on-board electrical power generator which can be operated by vehicle vibration when the train is moving and by fluid pressure when the train is stopped.

An additional object of the present invention is to provide an on-board electrical power generation system with a switching means for controlling the mode of operation from vibration to fluid pressure.

A further object of the present invention is to provide an on-board electrical power generation system with a sensing means that can control the switching mechanism automatically.

Yet another object of the present invention is to provide an on-board electrical power generation system that is adaptive to changes in vehicle vibration conditions due to changes in load conditions on the railway car.

Still another object of the present invention is to provide an on-board electrical power generation system that is adaptive to changes in weather or track conditions.

In addition to the several objects and advantages of the invention which have been described above, various other objects and advantages of the present invention will become more readily apparent to those persons who are skilled in the relevant art from the more detailed description of the invention, particularly, when such description is taken in conjunction with the attached drawing figures and with the appended claims.

Figure 1:
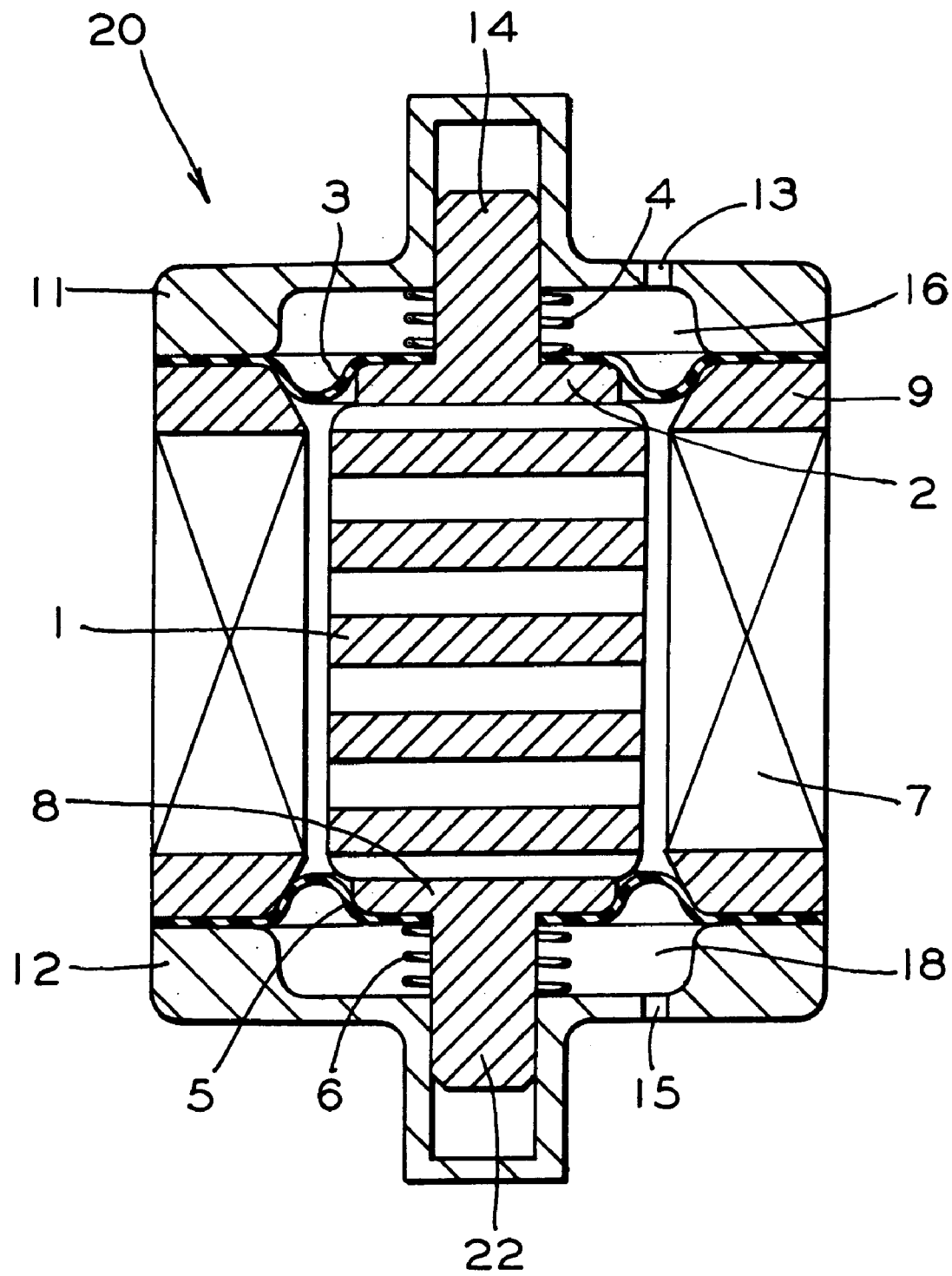
FIG. 1 is a cross sectional view of a vibration and fluid pressure generator unit of the present invention.

BRIEF DESCRIPTION OF THE PRESENTLY PREFERRED AND ALTERNATE EMBODIMENTS OF THE INVENTION

Prior to proceeding with the more detailed description of the present invention it should be noted that, for the sake of clarity, identical components which have identical functions have been designated by identical reference numerals throughout the several views illustrated in the drawings.

Reference is now made, more particularly, to FIG. 1. Illustrated therein is a electric power generator, generally designated 20, of the present invention. The generator 20 comprises a housing member 9 having a bore disposed along a longitudinal axis thereof. There is further a magnetic piston 1 axially disposed within the bore of housing member 9. The magnetic piston 1 has a first end 2 and a second end 8. Such first end 2 will be also be referred to as a top end 2, while such second end 8 will also be referred to as bottom end 8. The magnetic piston further has a first rodlike member 14 extending outwardly from such first end 2 and a second rodlike member 22 extending outwardly from said second end 8, rodlike members 14 and 22 extend outwardly substantially from a midpoint of a longitudinal axis extending through magnetic piston 1. Such rodlike members 14 and 22 have a first predetermined diameter and a second predetermined diameter, respectively.

A first diaphragm member 3 is disposed in housing 9. The first diaphragm member 3 has a first central opening with a third predetermined diameter. Such first diaphragm member 3 engages the first end 2 of magnetic piston 1 with such first rodlike member 14 of the magnetic piston 1 extending through the first central opening. There is further a first cover 11 for housing member 9. The first cover 11 has a cylindrically shaped and generally hollow projection which accommodates longitudinal movement of such first rodlike member 14 of magnetic piston 1. Further the first cover 11 has a first chamber 16 which is connected for fluid communication with a first source of fluid pressure, first chamber 16 being sealed by first diaphragm 3.

There is further a second diaphragm member 5 disposed in housing member 9. The second diaphragm 5 has a second central opening with a fourth predetermined diameter and engages second end 8 of magnetic piston 1 and having second rodlike member 22 extending through such second central opening. A second cover 12 for housing member 9 has a cylindrically shaped and generally hollow projection which accommodates longitudinal movement of such second rodlike member 22 of magnetic piston 1. Further the second cover 12 has a second chamber 18 connectable with a second source of fluid pressure. The second chamber 18 is sealed by second diaphragm 5. Such fluid pressure in second chamber 18 is being exhausted when such fluid pressure in the first chamber 16 is being pressurized and fluid pressure in such first chamber 16 is being exhausted when fluid pressure in such second chamber 18 is being pressurized. The difference in fluid pressure between the first chamber 16 and second chamber 18 causes the magnetic piston 1 to move from one end to the other depending upon which chamber is being pressurized. This sequence is then reversed and repeated causing magnetic piston 1 to oscillate between such first end and such second end of housing member 1.

Generator 20 has a first biasing means 4 axially disposed within first chamber 16. In a preferred embodiment of the invention the first biasing means 4 is disposed around the first rodlike member 14, which extends outwardly from first end 2 of magnetic piston 1, and is caged between first diaphragm member 3 and an inner surface of first cover 11. Such first biasing means 4 provides a first bias for the magnetic piston 1. There is a second biasing means 6 axially disposed within second chamber 18. In a preferred embodiment of the invention second biasing means 6 is disposed around the second rodlike member 22, which extends outwardly from the second end 8 of the magnetic piston 1, and is caged between second diaphragm 5 and an inner surface of second cover 12. Second biasing means 6 further provides a second bias for magnetic piston. In a presently preferred embodiment of the invention such first biasing means is a spring and such second biasing means is a spring.

The generator 20 further includes an electric coil 7 which is disposed within lousing 9 and positioned so as to encircle at least a predetermined portion of said magnetic piston 1 whereby movement of said magnetic piston 1 creates a voltage across said electric coil 7 and thereby generating such electrical power.

It should be noted that such rodlike members 14 and 22 which extend outwardly from the ends of the magnetic piston 1 and the cylindrically shaped and generally hollow projections on the first cover 11 and second cover 12 maintain the position of the magnetic piston 1 in the housing 9 and prevent the magnetic piston 1 from moving in a lateral direction.

One of the main features of generator 20 is the magnetic piston 1 which is engaged by first diaphragm 3 and first biasing means 4 combination on the first end 2 of the magnetic piston 1 and a second diaphragm 5 and second biasing means 6 combination on the second end 8 of the magnetic piston 1. This arrangement creates a mass-spring system, which can vibrate under external excitation. Thus, in this mode of operation, the vibration, which results from vehicle movement, allows magnetic piston 1 to oscillate and interact with electric coil 7 and thereby generate an electrical voltage across the coil 7 as a result of the vehicle vibration.

The diaphragms in the diaphragm-biasing means combinations create a sealed first chamber 16 between diaphragm 3 and first cover 11 and a sealed second chamber 18 formed by diaphragm 5 and second cover 12. The sealed chambers with the diaphragm-biasing means combinations permits the magnetic piston 1 to be operated by fluid pressure. In a preferred embodiment of the invention such fluid pressure is compressed air.

Fluid pressure enters the sealed chambers 16 and 18 through first orifice 13 on the first cover 11 and second orifice 15 in second cover 12. A control valve, not shown in FIG. 1, may be used to create a fluid pressure that alternates between the first chamber 16 and the second chamber 18 and thereby enable the magnetic piston 1 to oscillate by fluid pressure. Thus, in this mode, generator 20 can operate by fluid pressure and a voltage can be created while the railroad car is not moving. Such voltage can also be created by fluid pressure while the car is moving, if desired.

If the fluid pressure exhausts on first and second chambers 16 and 18, respectively, are restricted, the chambers will work like air springs. Therefore, exercising controls on the restrictions will allow the generator to adapt to variations in the vibration conditions of the railway vehicle where the generator is mounted. These conditions include changes in the magnitude and frequency of vibration, which could result from changes in vehicle load or speed as well as other changes which could be the result of changes in weather or track conditions.

It is important to notice that the generator 20 is disposed such that the magnetic piston 1 is positioned in a generally vertical direction with the diaphragm and biasing means on both the first end and the second end of the magnetic piston 1. It is preferred that the axis of the piston be such that the piston is made to oscillate in a generally vertical direction because this proivides the best mode for operation by means of vehicle vibration. The magnetic piston 1 can operate efficiently in the fluid pressure mode with the piston disposed in any direction but it operates more efficiently in the vibration mode if the magnetic piston 1 is disposed in a generally vertical direction.

Figure 2:
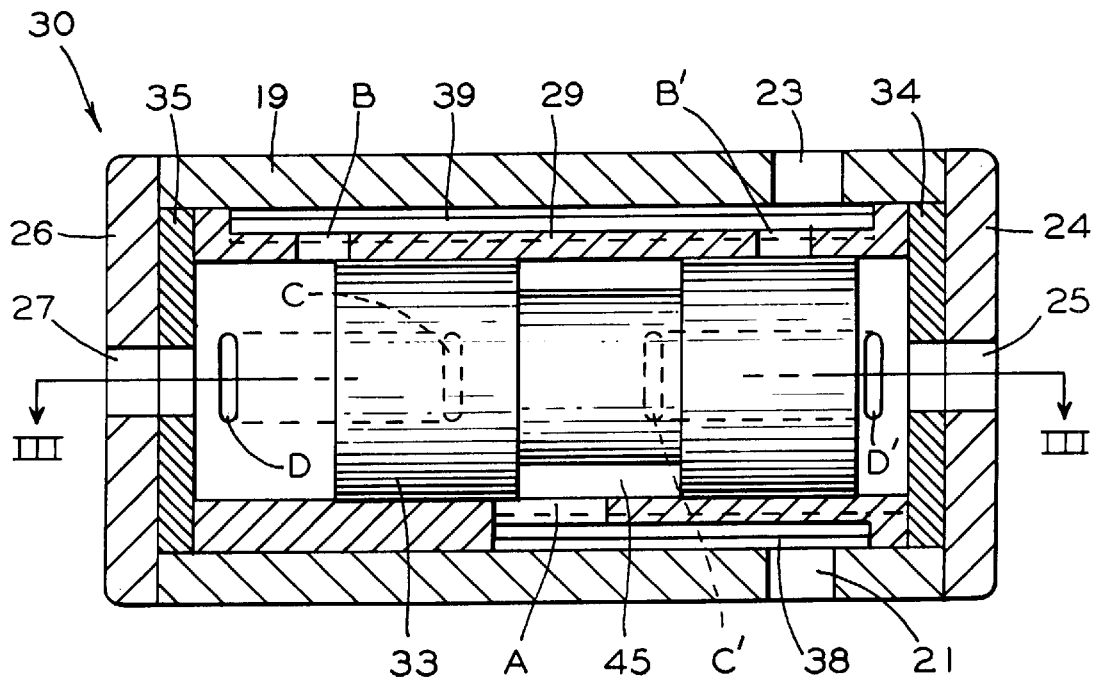
FIG. 2 is a cross sectional view of one embodiment of a piston type control valve of the present invention.
Figure 3:
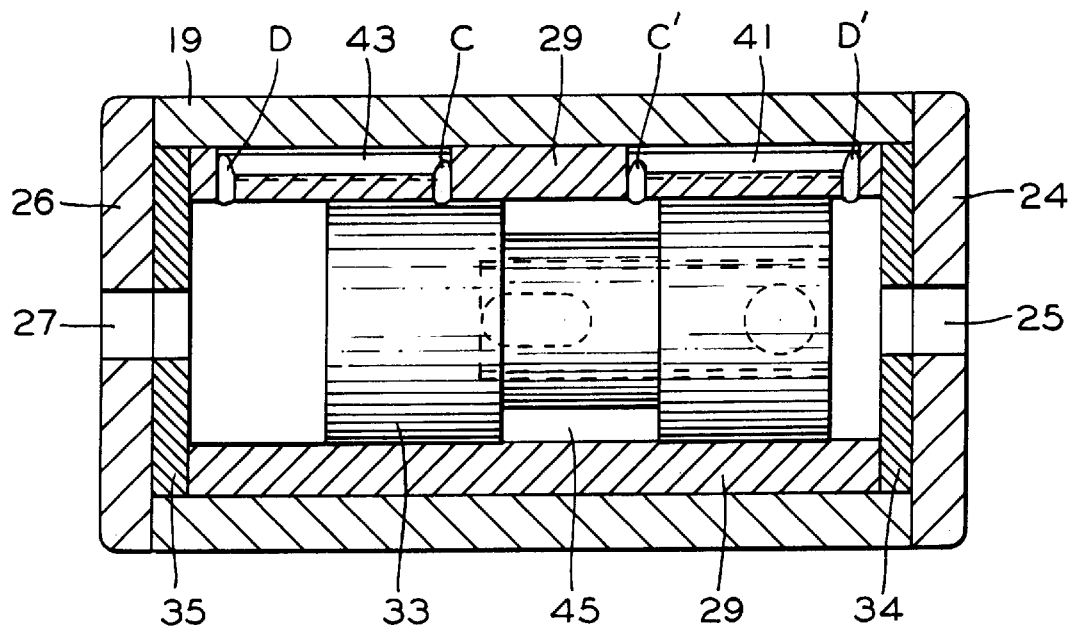
FIG. 3 is a sectional view of FIG. 3 taken across the lines of III—III showing the internal passageways.

Reference is now made to FIGS. 2 and 3. Illustrated therein is one embodiment of the invention in which such control valve, generally designated 30, is used to provide alternating fluid pressure in a power generating system disposed on a railway vehicle. Control valve 30 has an elongated housing member 19 having a predetermined shape. Such housing member 19 has a cylindrically shaped bore formed through said housing member 19 from a first end thereof to a second end thereof and along a longitudinal axis thereof.

There is further an inlet port 21 formed through a side wall of housing member 19 closely adjacent a first end thereof, inlet port 21 being adapted to be connected to a source of fluid pressure (not shown) and in fluid communication with such cylindrically shaped bore of housing member 19. There is an exhaust port 23 formed through such side wall of the housing member 19. Exhaust port 23 is substantially radially opposed to inlet port 21 and is in fluid communication between such cylindrically shaped bore and atmosphere.

Such control valve 30 has an elongated cylindrically shaped bushing 29, having an elongated cylindrically shaped bore disposed within the cylindrically shaped bushing 29. Such elongated cylindrically shaped bushing 29 is disposed along the longitudinal axis of housing member 19.

Such control housing 30 further has a first elongated and arcuately shaped fluid communication passageway 38 having a first predetermined length and a first predetermined depth formed in at least one of an inner surface of said housing member 19 and an outer surface of elongated cylindrically shaped bushing 29. First elongated and arcuately shaped fluid communication passageway 38 being disposed in fluid communication with inlet port 21.

A second elongated and arcuately shaped fluid communication passageway 39 having a second predetermined length and a second predetermined depth is formed in at least one of an inner surface of housing member 19 and an outer surface of elongated cylindrically shaped bushing 29, such second elongated and arcuately shaped fluid communication passageway 39 being disposed in fluid communication with exhaust port 23.

Such control valve 30 has a third elongated and arcuately shaped fluid communication passageway 41 having a third predetermined length and a third predetermined depth formed in at least one of an inner surface of housing member 19 and an outer surface of elongated cylindrically shaped bushing 29. Such third fluid communication passageway 41 is disposed at a point beginning closely adjacent the first end of housing member 19 and a first end of bushing 29.

A fourth elongated and arcuately shaped fluid communication passageway 43 having a fourth predetermined length and a fourth predetermined depth is also formed in at least one of inner surface of housing member 19 and an outer surface of bushing 29. Such fourth fluid communication passageway 43 is disposed at a point beginning closely adjacent the second end of the housing member 19 and a second end of bushing 29. In a preferred embodiment of the invention such passageways 41 and 43 begin at points substantially identical from such first end and such second end of bushing 29, respectively. It is also preferred that such third and such fourth predetermined lengths of passageways 41 and 43, respectively, be substantially identical.

There is a first aperture A having a first predetermined configuration formed through a sidewall of said elongated cylindrically shaped bushing substantially at a midpoint thereof. First aperture A is in fluid communication with first fluid communication passageway 38 and with such cylindrical bore of bushing 29.

A second aperture B' having a second predetermined configuration is formed through a sidewall of bushing 29. Aperture B' is substantially radially opposed to first aperture A and is disposed closely adjacent a first end of bushing 29. Second aperture B' is in fluid communication with the bore of bushing 29 and with second fluid communication passageway 39.

A third aperture B having a third predetermined configuration is formed through a sidewall of bushing 29. Third aperture B is substantially radially opposed to first aperture A and is disposed closely adjacent a second end of bushing 29. Third aperture B is in fluid communication with the cylindrically shaped bore of bushing 29 and with second fluid communication passageway 39.

It is preferred that apertures B and B' are positioned the same distance from the second end and the first end of the bushing 29, respectively. Although they are described as being closely adjacent the first and second ends of bushing 29, their exact position is determined by the dimension of piston 33 and that function will be discussed later.

There is a fourth aperture C' having a fourth predetermined configuration formed through a sidewall of bushing 19 disposed at a second end of the third fluid communication passageway 41. Such fourth aperture C' is in fluid communication with the bore of bushing 29 and with the third fluid communication passageway 41.

Such control valve 30 further has a fifth aperture D' having a fifth predetermined configuration formed through a sidewall of bushing 29 and disposed at the point beginning closely adjacent the first end of bushing 29 of third fluid communication passageway 41. Fifth aperture D' is in fluid communication with the cylindrically shaped bore of bushing 29 and with third fluid communication passageway 41.

There is a sixth aperture C having a sixth predetermined configuration formed through a sidewall of bushing 29 and disposed at a second end of the fourth fluid communication passageway 43. Sixth aperture C is in fluid communication with the cylindrically shaped bore of bushing 29 and with fourth fluid communication passageway 43.

Finally, there is a seventh aperture D having a seventh predetermined configuration formed through a sidewall of the bushing 29 and disposed at the beginning point, closely adjacent second end of bushing 29, of said fourth fluid communication passageway 43. Seventh aperture D is in fluid communication with the cylindrically shaped bore of bushing 29 and with fourth fluid communication passageway 43.

In a preferred embodiment of the invention it is preferred that such apertures C and C' be positioned substantially an equal distance, but in opposite directions, from a midpoint of bushing 29. It is also preferred that D' and D be positioned substantially an equal distance from such first end and such second end of bushing 29.

Control valve 30 has a piston 33 having a fifth predetermined length disposed for reciprocal movement within the cylindrically shaped bore of bushing 29 along a longitudinal axis thereof. Piston 33 has a center portion having a sixth predetermined length, such center portion having a reduced diameter forms a first chamber 45 between such center portion of the piston having a reduced diameter and with the cylindrically shaped bore of bushing 29. First chamber 45 of piston 33 is in fluid communication with first aperture A and one of fourth aperture C' and sixth aperture C. Such first chamber 45 can only be in fluid communication with fourth aperture C' or sixth aperture C at one time. If the piston 33 is moved such that first chamber 45 is in fluid communication with C' then C is sealed by the full diameter of piston 33. The reverse is true if first chamber 45 is in fluid communication with aperture C then aperture C' is sealed by the piston 33.

A first cover 24 is secured to the first end of housing member 19. There is a first outlet port 25 formed through first cover 24. First outlet port 25 is in fluid communication with the cylindrically shaped bore of bushing 29.

A second cover 26 is secured to the second end of housing member 19. A second outlet port 27 is formed through the second cover 26. Second outlet port 27 is in fluid communication with the cylindrically shaped bore of bushing 29.

In another embodiment of the invention there is further a first cushion 34 positioned inside such first cover 24 and a second cushion 35 positioned inside such second cover 26. Such first cushion 34 and second cushion 35 are used to prevent contact between the ends of piston 33 and such first and second covers, 24 and 26, respectively. Such first cushion 34 has an eighth aperture in fluid communication with the cylindrically shaped bore of bushing 29 and with the first outlet port 25 in first cover 24 while second cushion 35 has a ninth aperture in fluid communication with the cylindrically shaped bore of the bushing 29 and with the second outlet port 27 in second cover 26.

In the operation of the control valve 30 such fluid pressure from an external source enters control valve 30 through the inlet port 21. Fluid pressure is then communicated along the first fluid communication passageway 38 and through first aperture A into the first chamber 45. Such fluid pressure is then communicated through one of such fourth aperture C' and such sixth aperture C. In the position in which piston 33 is shown in FIG. 2 such fluid pressure is communicated to aperture C' while aperture C is sealed by the full diameter of piston 33. Fluid pressure passes through C' along third fluid communication passageway 41 to such fifth aperture D', where such fluid pressure returns to the cylindrically shaped bore of bushing 29. Such fluid pressure now exits from first outlet port 25. Fluid pressure also builds up behind the end of piston 33 near first outlet port 25 forcing piston 33 away from such first end of housing member 19 toward the opposite end of housing member 19. Piston 33 will move in that direction until piston 33 has moved a distance sufficient for the end of piston 33 to uncover second aperture B' which opens the fluid pressure behind piston 33 to exhaust port 23 through the second fluid passageway 39. Aperture B is sealed by the other end of piston 33.

At the same time as piston 33 moves toward the second end of housing member 19, piston 33 covers aperture C' but now the first chamber 45 formed by the reduced diameter portion of piston 33 has moved far enough that sixth aperture C is now in fluid communication with first chamber 45. Fluid pressure from aperture A now passes through first chamber 45 of piston 33 to such aperture C. Aperture C is further in fluid communication with a seventh aperture D by way of fourth fluid passageway 43. Fluid pressure is now free to flow through aperture D where it returns to cylindrically shaped bore of bushing 29. Fluid pressure now exits from second outlet port 27 and fluid pressure now builds up behind the other end of piston 33 forcing piston 33 in a reciprocal direction toward the first end of housing member 19. This proceeds until piston 33 clears aperture B, at which time fluid pressure is vented through aperture B through the fourth fluid passageway 39 to exhaust port 23 and out to atmosphere.

Meanwhile, the piston 33 has traveled far enough that aperture C is closed and aperture C' is again in fluid communication with the first chamber 45. Thus, fluid pressure again travels through aperture C', along the third fluid passageway 41 to aperture D' and to first outlet port 25. As before, piston 33 is again forced toward the second end of housing member 19 and the cycle is repeated. Alternately, fluid pressure is communicated through the first outlet port 25 and then through the second outlet port 27.

As discussed previously even though apertures B and B' were described as being closely adjacent first and second ends of bushing 29, the positioning of apertures B and B' from the respective ends of bushing 19 is such that the piston 33 must move a sufficient distance so that aperture C' is closed and aperture C is exposed when the piston 33 clears aperture B' and permits fluid pressure to exhaust. Aperture B is positioned in a similar manner in that the piston 33 must move sufficiently so that aperture C' is open and aperture C is closed when the piston clears B and permits fluid pressure to exhaust. Apertures B and B' provide a means for fluid communication from opposite ends of the interior of bushing 29 to exhaust port 23 through the annular path.

One more point on the operation of piston 33, since apertures B and B' are always in fluid communication with exhaust port 23, which is open to atmosphere, there will always be some residual air in the interior of the bushing 29 when the piston 33 is approaching such cushion 34 or 35. The residual air will compress and further act with a cushioning effect to prevent such piston 33 from pushing hard against cushions 34 and 35.

Figure 4:
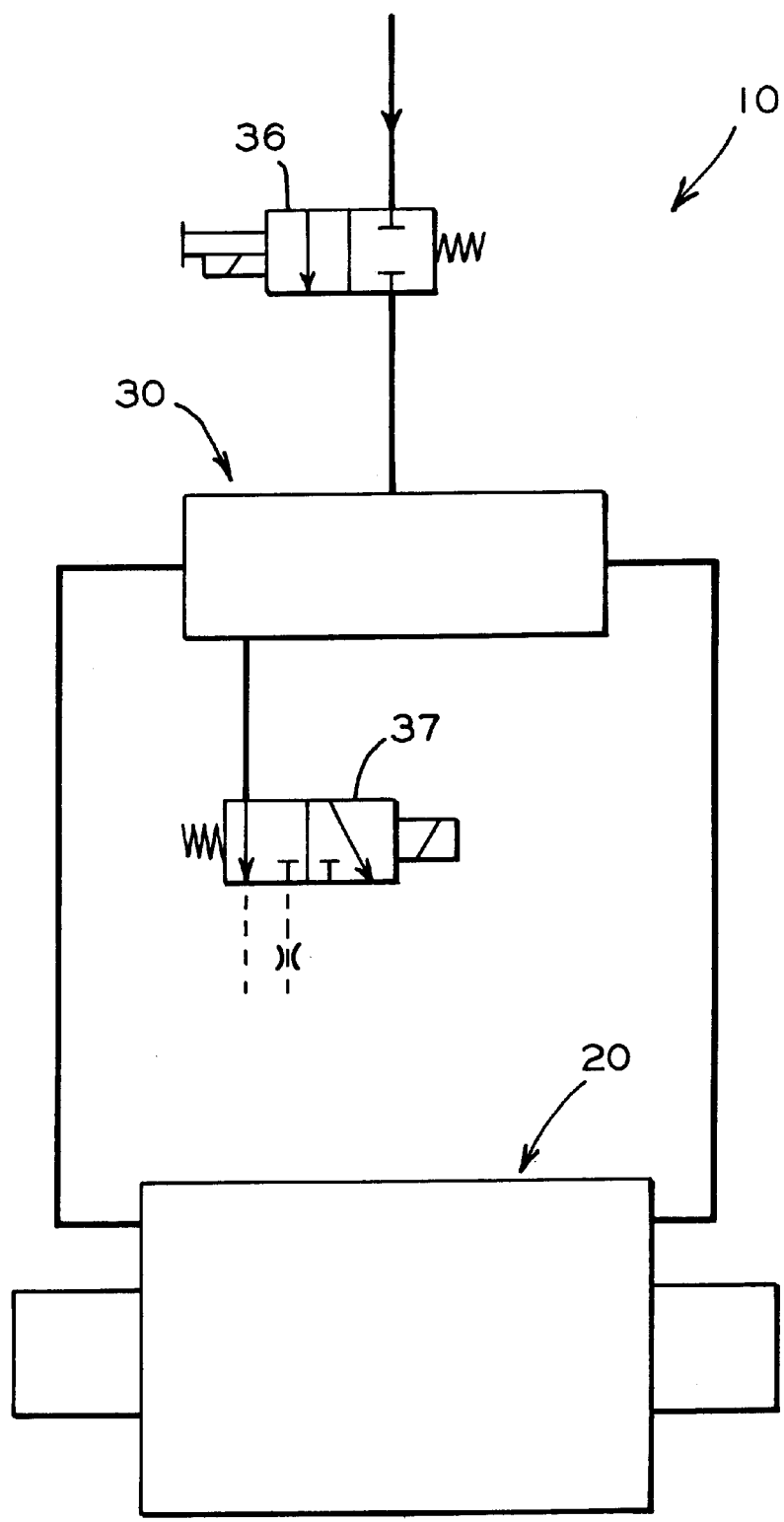
FIG. 4 is a schematic view of an on-board electrical power generation system operated by vibration or fluid pressure.

Reference is now made to FIG. 4. Illustrated therein is a schematic representation of one embodiment of an on-board electrical generation system, generally designated 10. In this embodiment the generator unit 20, described in detail previously, can be operated by vibration or fluid pressure. A piston control valve 30, as shown in FIGS. 2 and 3, is used to communicate fluid pressure to such first chamber and second chamber of the generator so that the generator unit 20 may operate by fluid pressure.

A switching means is used to control the flow of fluid pressure to piston control valve 30. In a presently preferred embodiment of the invention such switching means is a solenoid valve 36.

In a preferred embodiment of the invention solenoid valve 36 is used to control the flow of fluid pressure to such piston control valve 30. Solenoid valve 36 is normally closed which is a de-energized position. In this position no fluid pressure communicates with piston control valve 30 and generator 20. The input to control valve 30 is open to atmosphere. Under this condition the generator 20 operates in a vibration mode and relies on vehicle vibration to cause the magnetic piston to oscillate between the diaphragm and biasing means combinations to generate electrical voltage across the coil.

When the railway car is stopped, solenoid valve 36 is energized and fluid pressure is communicated to the piston control valve 30 and hence with generator 20. In this mode, generator 20 operates by fluid pressure. In a preferred embodiment of the invention such fluid pressure is air pressure from a brake line of the railway car.

A second switching means, solenoid valve 37, may be used in the on-board electrical power generation system 10 to make the system more responsive to variations in vehicle vibration conditions due to changes in load or speed, or changes in weather and track conditions.

With proper control, operation can be made adaptive to a broad range of vibration conditions which will be encountered by the railway vehicle. One of the more commonly seen variations, which requires only a very simple control, is that which can result from a change in the empty or load conditions of the railway car. Normally, the system is geared to operate with railway cars in a loaded condition and thus changes are then made to accommodate any changes in the vibration conditions that occur when the car is empty.

The second solenoid valve 37 is adaptive to empty/load conditions. In a de-energized position such valve 37 has unrestricted exhaust. This position is used where the valve would normally be set for operation in either the fluid pressure mode or in the normal vibration mode. This mode would be used for full railroad cars. However, if the railway car is empty solenoid valve 37 switches to an energized position. In this energized position such solenoid valve 37 opens to a restricted exhaust.

In a preferred embodiment of the on-board electrical generation system, sensing means are used to control such solenoid valves 36 and 37 so that the operation of the system is automatic.

It will be understood that various alterations and changes may be made by those skilled in the art without departing from the spirit and scope of the subject invention. Therefore, it will be appreciated that certain modifications, ramifications, and equivalents will be readily apparent to persons skilled in the art, and accordingly, it is understood that the present invention should not be limited to the exact embodiments shown and described, but should be accorded the full scope and protection of the appended claims.

I claim:

1. An on-board electrical power generation system for generating electrical power on a railway vehicle, said on-board electrical power generation system comprising:

(a) a generator assembly, said generator assembly including;

(i) a housing member having a bore disposed along a longitudinal axis thereof;

(ii) a magnetic piston axially disposed for reciprocal movement within said bore of said housing member, said magnetic piston having a first end and a second end, said first end and said second end having a first rodlike member and a second rodlike member, respectively, extending outwardly substantially from a midpoint of a longitudinal axis extending through said magnetic piston, said first rodlike member having a first predetermined diameter and said second rodlike member having a second predetermined diameter;

(iii) a first diaphragm member disposed in said housing member, said first diaphragm member having a first central opening, said first central opening having a third predetermined diameter, said first diaphragm member engaging said first end of said magnetic piston with said first rodlike member of said magnetic piston extending through said first central opening;

(iv) a first cover secured to a first end of said housing member, said first cover including a first cylindrically shaped and generally hollow projection extending in an outwardly direction to accommodate longitudinal movement of said first rodlike member of said magnetic piston therein, said first cover further including a first chamber in fluid communication with said first generally hollow projection, said first chamber further being connected for fluid communication with a first source of fluid pressure, said first chamber being sealed by said first diaphragm member;

(v) a second diaphragm member disposed in said housing member, said second diaphragm member having a second central opening, said second central opening having a fourth predetermined diameter, said second diaphragm member engaging said second end of said magnetic piston with said second rodlike member of said magnetic piston extending through said second central opening;

(vi) a second cover secured to a second end of said housing member, said second cover including a second cylindrically shaped and generally hollow projection extending in an outwardly direction to accommodate longitudinal movement of said second rodlike member of said magnetic piston therein, said second cover further including a second chamber in fluid communication with said second generally hollow projection, said second chamber further being connected for fluid communication with a second source of fluid pressure, said second chamber being sealed by said second diaphragm member; wherein fluid pressure in said second chamber is being exhausted when fluid pressure in said first chamber is being pressurized and fluid pressure in said first chamber is being exhausted when fluid pressure in said second chamber is being pressurized;

(vii) a first biasing means axially disposed within one of said first generally hollow projection and said first chamber and caged between an inner surface of said first cover and one of an end surface of said first rodlike member and said first diaphragm member for urging said magnetic piston in a first direction;

(viii) a second biasing means axially disposed within one of said second generally hollow projection and said second chamber and caged between an inner surface of said second cover and one of an end surface of said second rodlike member and said second diaphragm member for urging said magnetic piston in a second direction, said second direction being reciprocal to said first direction; and (ix) an electric coil disposed within said housing member and disposed so as to enclose said magnetic piston whereby movement of said magnetic piston creates a voltage across said electric coil and thereby generating electrical power;

(b) a piston type control valve connectable to a source of fluid pressure and further in fluid communication with said first chamber in said first cover and said second chamber in said second cover of said generator assembly, said piston type control valve providing fluid pressure alternately to said first chamber in said first cover and said second chamber in said second cover of said generator assembly causing said magnetic piston to oscillate between said first diaphragm and first biasing means and said second diaphragm and said second biasing means; and (c) a switching means for controlling such fluid pressure supply to said control valve, said switching means opening to permit fluid communication with said control valve when such railway car is stopped thereby causing said magnetic piston to oscillate by fluid pressure and closing to restrict fluid communication to said control valve when such railway car is moving thereby permitting said magnetic piston to oscillate between said first diaphragm and said first biasing means and said second diaphragm and said second biasing means by means of vehicle vibration.

2. An on-board electrical power generation system for generating electrical power on a railway vehicle, according to claim 1, wherein said magnetic piston is disposed in a generally vertical direction within said housing.

3. An on-board electrical power generation system for generating electrical power on a railway vehicle, according to claim 1, wherein said switching means for controlling such supply of fluid pressure to said control valve is a solenoid valve.

4. An on-board electrical power generation system for generating electrical power on a railway vehicle, according to claim 1, wherein said on-board electrical power generation system further includes a sensing means connected electrically to said switching means for controlling automatic switching between a fluid pressure mode of operation and a vibrational mode of operation.

5. An on-board electrical power generation system for generating electrical power on a railway vehicle, according to claim 4, wherein said second solenoid valve is energized when such railway car is in an empty condition, said solenoid valve having a restricted exhaust when energized.

6. An on-board electrical power generation system for generating electrical power on a railway vehicle, according to claim 1, wherein said switching means further includes a second solenoid valve which is in fluid communication with an exhaust port of said control valve, said second solenoid valve permitting said on-board electrical power generation system to be sensitive to changes in vibration because of empty conditions.

7. An on-board electrical power generation system for generating electrical power on a railway vehicle, according to claim 6, wherein said sensing means further includes a second sensor for discerning variations in load conditions.

8. An on-board electrical power generation system for generating electrical power on a railway vehicle, according to claim 1, wherein said fluid pressure is pneumatic.

9. An on-board electrical power generation system for generating electrical power on a railway vehicle, according to claim 1, wherein said first biasing means and said second biasing means in said generator unit are springs.

10. An electric power generator for generating electrical power on a railway vehicle, said electrical power generator comprising:

(a) a housing member having a bore disposed along a longitudinal axis thereof;

(b) a magnetic piston axially disposed for reciprocal movement within said bore of said housing member, said magnetic piston having a first end and a second end, said first end and said second end having a first rodlike member and a second rodlike member, respectively, extending outwardly substantially from a midpoint of a longitudinal axis extending through said magnetic piston, said first rodlike member having a first predetermined diameter and said second rodlike member having a second predetermined diameter;

(c) a first diaphragm member disposed in said housing member, said first diaphragm member having a first central opening, said first central opening having a third predetermined diameter, said first diaphragm member engaging said first end of said magnetic piston with said first rodlike member of said magnetic piston extending through said first central opening;

(d) a first cover secured to a first end of said housing member, said first cover including a first cylindrically shaped and generally hollow projection extending in an outwardly direction to accommodate longitudinal movement of said first rodlike member of said magnetic piston therein, said first cover further including a first chamber in fluid communication with said first generally hollow projection, said first chamber further being connected for fluid communication with a first source of fluid pressure, said first chamber being sealed by said first diaphragm member;

(e) a second diaphragm member disposed in said housing member, said second diaphragm member having a second central opening, said second central opening having a fourth predetermined diameter, said second diaphragm member engaging said second end of said magnetic piston with said second rodlike member of said magnetic piston extending through said second central opening;

(f) a second cover secured to a second end of said housing member, said second cover including a second cylindrically shaped and generally hollow projection extending in an outwardly direction to accommodate longitudinal movement of said second rodlike member of said magnetic piston therein, said second cover further including a second chamber in fluid communication with said second generally hollow projection, said second chamber further being connected for fluid communication with a second source of fluid pressure, said second chamber being sealed by said second diaphragm member; wherein fluid pressure in said second chamber is being exhausted when said first chamber is being pressurized and fluid pressure in said first chamber is being exhausted when said second chamber is being pressurized;

(g) a first biasing means axially disposed within one of said first generally hollow projection and said first chamber and caged between an inner surface of said first cover and one of an end surface of said first rodlike member and said first diaphragm member for urging said magnetic piston in a first direction;

(h) a second biasing means axially disposed within one of said second generally hollow projection and said second chamber and caged between an inner surface of said second cover and one of an end surface of said second rodlike member and said second diaphragm member for urging said magnetic piston in a second direction, said second direction being reciprocal to said first direction; and (i) an electric coil disposed within said housing member and positioned to encircle at least a predetermined portion of said magnetic piston whereby movement of said magnetic piston creates a voltage across said electric coil and thereby generating such electrical power.

11. An electric power generator for generating electrical power on a railway vehicle, according to claim 10, wherein said first biasing means and said second biasing means are springs.

12. An electric power generator for generating electrical power on a railway vehicle, according to claim 11, wherein said first biasing means is disposed around said first rodlike member at said first end of said magnetic piston, said first biasing means being caged between said first diaphragm member and an inner surface of said first cover, and said second biasing means is disposed around said second rodlike member at said second end of said magnetic piston, said second biasing means being caged between said second diaphragm member and an inner surface of said second cover.

13. An electric power generator for generating electrical power on a railway vehicle, according to claim 11, wherein said spring of said first biasing means and said spring of said second biasing means are substantially identical.

14. An electric power generator for generating electrical power on a railway vehicle, according to claim 10, wherein said fluid pressure is pneumatic.

15. An electric power generator for generating electrical power on a railway vehicle, according to claim 10, wherein said magnetic piston is disposed in a generally vertical direction within said housing during service.

16. An electric power generator for generating electrical power on a railway vehicle, according to claim 10, wherein said first predetermined diameter and said second predetermined diameter are substantially identical.

17. An electric power generator for generating electrical power on a railway vehicle, according to claim 10, wherein said third predetermined diameter and said fourth predetermined diameter are substantially identical.

18. An electric power generator for generating electrical power on a railway vehicle, said electrical power generator comprising:

(a) a housing member having a bore disposed along a longitudinal axis thereof;

(b) a magnetic piston axially disposed for reciprocal movement within said bore of said housing member, said magnetic piston having a first end and a second end, said first end and said second end having a first rodlike member and a second rodlike member, respectively, extending outwardly substantially from a midpoint of a longitudinal axis extending through said magnetic piston, said first rodlike member having a first predetermined diameter and said second rodlike member having a second predetermined diameter;

(c) a first diaphragm member disposed in said housing member, said first diaphragm member having a first central opening, said first central opening having a third predetermined diameter, said first diaphragm member engaging said first end of said magnetic piston with said first rodlike member of said magnetic piston extending through said first central opening;

(d) a first cover secured to a first end of said housing member, said first cover including a first cylindrically shaped and generally hollow projection extending in an outwardly direction to accommodate longitudinal movement of said first rodlike member of said magnetic piston therein, said first cover further including a first chamber in fluid communication with said first generally hollow projection, said first chamber further being connected for fluid communication with a first source of fluid pressure, said first chamber being sealed by said first diaphragm member;

(e) a second diaphragm member disposed in said housing member, said second diaphragm member having a second central opening, said second central opening having a fourth predetermined diameter, said second diaphragm member engaging said second end of said magnetic piston with said second rodlike member of said magnetic piston extending through said second central opening;

(f) a second cover secured to a second end of said housing member, said second cover including a second cylindrically shaped and generally hollow projection extending in an outwardly direction to accommodate longitudinal movement of said second rodlike member of said magnetic piston therein, said second cover further including a second chamber in fluid communication with said second generally hollow projection, said second chamber further being connected for fluid communication with a second source of fluid pressure, said second chamber being sealed by said second diaphragm member; wherein fluid pressure in said second chamber is being exhausted when said first chamber is being pressurized and fluid pressure in said first chamber is being exhausted when said second chamber is being pressurized; and (g) an electric coil disposed within said housing member and positioned to encircle at least a predetermined portion of said magnetic piston whereby movement of said magnetic piston creates a voltage across said electric coil and thereby generating such electrical power.

19. An electric power generator for generating electrical power on a railway vehicle, according to claim 18, wherein said generator further includes a first resistance means engagable with said magnetic piston and disposed within said first chamber for preventing contact between said magnetic piston and an inner surface of said first cover and a second resistance means engagable with said magnetic piston and disposed within said second chamber for preventing contact between said magnetic piston and an inner surface of said second cover.

20. An electric power generator for generating electrical power on a railway vehicle, according to claim 19, wherein said first resistance means and said second resistance means are springs.

21. An electric power generator for generating electrical power on a railway vehicle, according to claim 18, wherein said fluid pressure is pneumatic.

22. An electric power generator for generating electrical power on a railway vehicle, said electrical power generator comprising:
(a) a housing member having a bore disposed along a longitudinal axis thereof;
(b) a magnetic piston axially disposed for reciprocal movement within said bore of said housing member, said magnetic piston having a first end and a second end, said first end and said second end having a first rodlike member and a second rodlike member, respectively, extending outwardly substantially from a midpoint of a longitudinal axis extending through said magnetic piston, said first rodlike member having a first predetermined diameter and said second rodlike member having a second predetermined diameter;
(c) a first cover secured to a first end of said housing member, said first cover including a first cylindrically shaped and generally hollow projection extending in an outwardly direction to accommodate longitudinal movement of said first rodlike member of said magnetic piston therein, said first cover further including a first chamber in fluid communication with said first generally hollow projection;
(d) a second cover secured to a radially opposed second end of said housing member, said second cover including a second cylindrically shaped and generally hollow projection extending in an outwardly direction to accommodate longitudinal movement of said second rodlike member of said magnetic piston, said second cover further including a second chamber in fluid communication with said second generally hollow projection;
(e) a first biasing means axially disposed within one of said first generally hollow projection and said first chamber and caged between an inner surface of said first cover and one of an end surface of said first rodlike member and an end surface of said first end of said magnetic piston for urging said magnetic piston in a first direction;
(f) a second biasing means axially disposed within one of said second generally hollow projection and said second chamber and caged between an inner surface of said second cover and one of an end surface of said second rodlike member and an end surface of said second end of said magnetic piston for urging said magnetic piston in a second direction, said second direction being reciprocal to said first direction; and
(g) an electric coil disposed within said housing member and positioned to encircle at least a predetermined portion of said magnetic piston whereby movement of said magnetic piston creates a voltage across said electric coil and thereby generating such electrical power.

23. An electric power generator for generating electrical power on a railway vehicle, according to claim 22, wherein said first biasing means and said second biasing means are springs.

24. An electric power generator for generating electrical power on a railway vehicle, according to claim 23, wherein said first biasing means is disposed around at least a predetermined portion of said first rodlike member at said first end of said magnetic piston, said first biasing means being caged between an inner surface of said first cover and said first end of said magnetic piston, and said second biasing means is disposed around at least a predetermined portion of said second rodlike member at said second end of said magnetic piston, said second biasing means being caged between an inner surface of said second cover and said second end of said magnetic piston.

25. An electric power generator for generating electrical power on a railway vehicle, according to claim 22, wherein said magnetic piston is disposed in a generally vertical direction within said housing during service.

26. A control valve for use in a power generating system disposed on a railway vehicle, said control valve comprising:
(a) an elongated housing member having a predetermined shape;
(b) a cylindrically shaped bore formed through said housing member from a first end thereof to a second end thereof and along a longitudinal axis thereof;
(c) an inlet port formed through a side wall of said housing member closely adjacent said first end thereof, said inlet port being adapted to be connected to a source of fluid pressure and in fluid communication with said cylindrically shaped bore;
(d) an exhaust port formed through said side wall of said housing member substantially radially opposed to said inlet port and in fluid communication between said cylindrically shaped bore and atmosphere;
(e) an elongated cylindrically shaped bushing having an elongated cylindrically shaped bore disposed within said cylindrically shaped bore along said longitudinal axis of said housing member;
(f) a first elongated and arcuately shaped fluid communication passageway having a first predetermined length and a first predetermined depth formed in at least one of an inner surface of said housing member and an outer surface of said elongated cylindrically shaped bushing, said first elongated and arcuately shaped fluid communication passageway being disposed in fluid communication with said inlet port;
(g) a second elongated and arcuately shaped fluid communication passageway having a second predetermined length and a second predetermined depth formed in at least one of said inner surface of said housing member and said outer surface of said elongated cylindrically shaped bushing, said second elongated and arcuately shaped fluid communication passageway being disposed in fluid communication with said exhaust port;
(h) a third elongated and arcuately shaped fluid communication passageway having a third predetermined length and a third predetermined depth formed in at least one of said inner surface of said housing member and said outer surface of said elongated cylindrically shaped bushing, said third elongated and arcuately shaped fluid communication passageway disposed at a point beginning closely adjacent said first end of said housing member and a first end of said elongated cylindrically shaped bushing;
(i) a fourth elongated and arcuately shaped fluid communication passageway having a fourth predetermined length and a fourth predetermined depth formed in at least one of said inner surface of said housing member and said outer surface of said elongated cylindrically shaped bushing, said fourth elongated and arcuately shaped fluid communication passageway disposed at a point beginning closely adjacent said second end of said housing member and a second end of said elongated cylindrically shaped bushing;

(j) a first aperture having a first predetermined configuration formed through a sidewall of said elongated cylindrically shaped bushing substantially at a midpoint thereof, said first aperture in fluid communication with said first elongated and arcuately shaped fluid communication passageway and with said elongated cylindrically shaped bore of said elongated cylindrically shaped bushing;

(k) a second aperture having a second predetermined configuration formed through a sidewall of said elongated cylindrically shaped bushing substantially radially opposed to said first aperture and disposed closely adjacent said first end of said bushing, said second aperture in fluid communication with said elongated cylindrically shaped bore of said elongated cylindrically shaped bushing and with said second elongated and arcuately shaped fluid communication passageway;

(l) a third aperture having a third predetermined configuration formed through a sidewall of said elongated cylindrically shaped bushing substantially radially opposed to said first aperture and disposed closely adjacent said second end of said bushing, said third aperture in fluid communication with said elongated cylindrically shaped bore of said elongated cylindrically shaped bushing and with said second elongated and arcuately shaped fluid communication passageway;

(m) a fourth aperture having a fourth predetermined configuration formed through a sidewall of said elongated cylindrically shaped bushing disposed at a second end of said third elongated and arcuately shaped fluid communication passageway, said fourth aperture in fluid communication with said elongated cylindrically shaped bore of said elongated cylindrically shaped bushing and with said third elongated and arcuately shaped fluid communication passageway;

(n) a fifth aperture having a fifth predetermined configuration formed through a sidewall of said elongated cylindrically shaped bushing disposed at said point beginning closely adjacent said first end of said bushing of said third elongated and arcuately shaped fluid communication passageway, said fifth aperture in fluid communication with said elongated cylindrically shaped bore of said elongated cylindrically shaped bushing and with said third elongated and arcuately shaped fluid communication passageway;

(o) a sixth aperture having a sixth predetermined configuration formed through a sidewall of said elongated cylindrically shaped bushing disposed at a second end of said fourth elongated and arcuately shaped fluid communication passageway, said sixth aperture in fluid communication with said elongated cylindrically shaped bore of said elongated cylindrically shaped bushing and with said fourth elongated and arcuately shaped fluid communication passageway;

(p) a seventh aperture having a seventh predetermined configuration formed through a sidewall of said elongated cylindrically shaped bushing disposed at said point beginning closely adjacent said second end of said bushing of said fourth elongated and arcuately shaped fluid communication passageway, said seventh aperture in fluid communication with said elongated cylindrically shaped bore of said elongated cylindrically shaped bushing and with said fourth elongated and arcuately shaped fluid communication passageway;

(q) a piston having a fifth predetermined length disposed for reciprocal movement within said elongated cylindrically shaped bore of said elongated cylindrically shaped bushing along a longitudinal axis thereof, said piston having a center portion having a sixth predetermined length, said center portion having a reduced diameter forming a first chamber between said center portion of said piston having a reduced diameter and said elongated cylindrically shaped bore of said elongated cylindrically shaped bushing, said first chamber in fluid communication with said first aperture and one of said fourth aperture and said sixth aperture;

(r) a first cover secured to said first end of said elongated housing member;

(s) a first outlet port formed through said first cover, said first outlet port in fluid communication with said elongated cylindrically shaped bore of said elongated cylindrically shaped bushing;

(t) a second cover secured to said second end of said elongated housing member;

(u) a second outlet port formed through said second cover, said second outlet port in fluid communication with said elongated cylindrically shaped bore of said elongated cylindrically shaped bushing; wherein such fluid pressure from such external source enters said control valve through said inlet port, such fluid pressure is communicated through said first elongated and arcuately shaped fluid communication passageway through said first aperture into said first chamber, such fluid pressure is communicated through one of said fourth aperture and said sixth aperture through one of said third and said fourth elongated and arcuately shaped fluid communication passageways to one of said fifth aperture and said seventh aperture where such fluid pressure returns to said elongated cylindrically shaped bore of said elongated cylindrically shaped bushing, such fluid pressure exits from one of said first and said second outlet ports and builds up pressure behind one end of said piston forcing said piston to move toward an opposite end of said housing member until said piston has moved a sufficient distance to uncover one of said second aperture and said third aperture and close such other of said second aperture and said third aperture, while said first chamber of said piston has moved a sufficient distance so as to provide fluid communication to such one of said fourth aperture and said sixth aperture which was not previously in fluid communication with said first chamber, such fluid pressure, while exiting from such other one of said first outlet port and said second outlet port, now builds up pressure behind an opposite end of said piston causing said piston to move in a reciprocal direction.

27. A piston type control valve in an electrical power generation system disposed on a railway vehicle, according to claim 26, wherein said control valve further includes a first cushion disposed within said housing member between said first end of said bushing and said first cover and a second cushion disposed within said housing member between said second end of said bushing and said second cover, said first cushion having an eighth aperture in fluid communication with said elongated cylindrically shaped bore of said elongated cylindrically shaped bushing and with said first outlet port in said first cover and said second cushion having a ninth aperture in fluid communication with said elongated cylindrically shaped bore of said elongated cylindrically shaped bushing and with said second outlet port in said second cover.

28. A piston type control valve in an electrical power generation system disposed on a railway vehicle, according to claim 26, wherein said fluid pressure is pneumatic.

\* \* \* \* \*